Aug. 20, 1968 R. E. KING ET AL 3,397,551

TEMPERATURE CONTROL MEANS FOR REFRIGERATOR

Filed Dec. 2, 1966

INVENTORS
RALPH E. KING
& JULUIS B. HORVAY
BY
*Walter E Rule*
THEIR ATTORNEY

United States Patent Office 3,397,551
Patented Aug. 20, 1968

3,397,551
TEMPERATURE CONTROL MEANS FOR REFRIGERATOR
Ralph E. King and Julius B. Horvay, Louisville, Ky., assignors to General Electric Company, a corporation of New York
Filed Dec. 2, 1966, Ser. No. 598,784
2 Claims. (Cl. 62—202)

ABSTRACT OF THE DISCLOSURE

A refrigerator including a compressor-condenser system with bimetal means to control the compressor. A heater in parallel with the compressor and in heat exchange with the bimetal, wherein the heater is energized only when the compressor is on.

---

Figure 1:
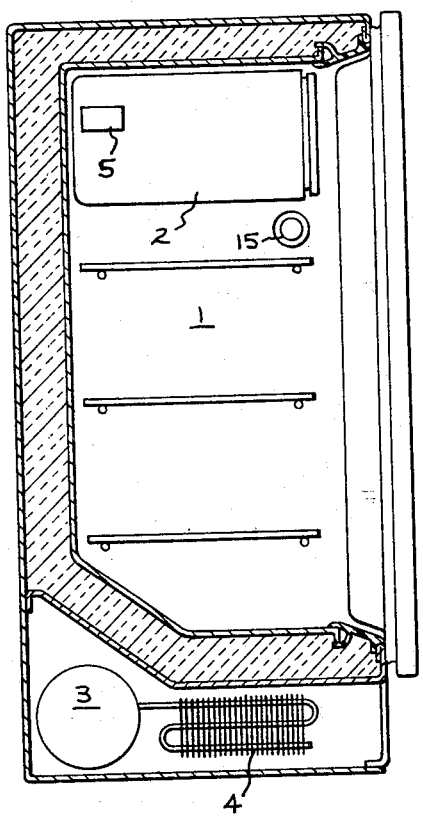

The present invention relates to household refrigerators including an above-freezing storage compartment cooled by means of an evaporator operating continuously at below-freezing temperatures and is more particularly concerned with an improved adjustable bimetal temperature control means for regulating the temperature maintained in that compartment.

In one type of household refrigerator, a single evaporator, positioned within the fresh food compartment, is employed for providing both a below-freezing storage volume and for maintaining the compartment at the desired above-freezing temperature by natural circulation of compartment air over the evaporator surfaces. The control devices employed in available refrigerators for controlling the operation of the refrigeration system and some degree of adjustment of the compartment temperatures have been the relatively expensive thermostats of the vapor filled bellows-capillary type including one switch contact operably connected to the bellows and a second adjustable or movable switch contact for varying the temperature at which the contacts close to operate the refrigeration system.

It has also been proposed to employ bimetal switch means responsive to the evaporator temperature for this purpose and to provide a continuously energized electrical resistance heater and a control rheostat for modifying the action of the switch means and thereby vary the fresh food compartment temperature. However, in actual practice the continuous energization of such a heater may result in short cycling and overloading of the compressor due primarily to a shortening of the compressor "off" time to a point such that refrigerant pressures within the system cannot equalize during the "off" cycles.

An object of the present invention is to provide an adjustable control means which is less expensive than the bellows type controls presently used for the above-described purposes.

A more specific object of the invention is to provide in a household refrigerator, a low cost bimetal operated switch means for energizing the refrigeration system at a constant below-freezing evaporator temperature and deenergizing the refrigeration system at any of a plurality of lower temperatures in such a manner that the aforementioned disadvantages of a bimetal control are eliminated.

Further objects and advantages of the invention will become apparent as the following description proceeds and the features of novelty which characterized the invention will be pointed out with particularity in the claims annexed to and forming part of this specification.

In accordance with the illustrated embodiment of the present invention, there is provided a refrigerator including a fresh food storage compartment, and a below-freezing evaporator for cooling the compartment and forming part of a refrigeration system including a compressor. The operation of the compressor and hence the supply of condensed refrigerant to the evaporator is controlled by a bimetal switch means positioned to sense the evaporator temperature and designed to energize the compressor at a constant upper but below-freezing temperature and to deenergize the compressor at a selected lower temperature. To provide for the adjustment of the temperature maintained in the storage compartment, the control circuitry includes a heating element in heating relationship to the bimetal switch means and energized only when the compressor is energized for biasing the switch to a closed position and an adjustable resistor for varying the heat output of the heating element.

Figure 2:
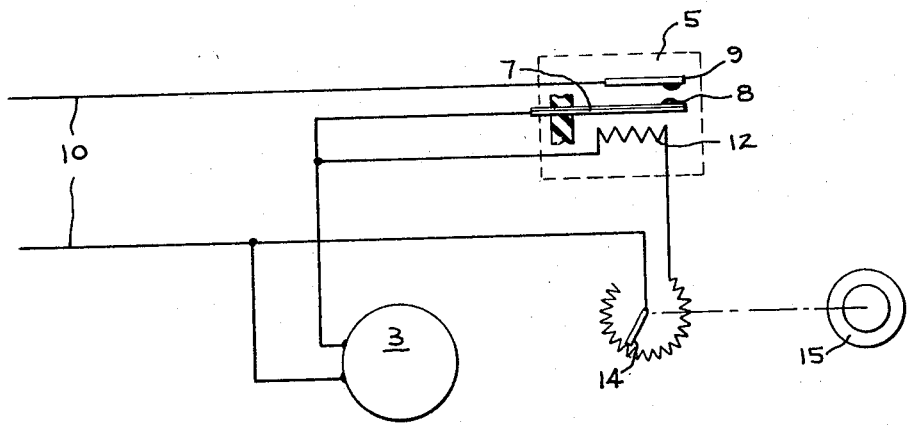

For a more detailed description of the invention reference may be had to the accompanying drawing in which:

FIGURE 1 is a schematic illustration of a refrigerator incorporating the present invention; and FIGURE 2 is a diagrammatic illustration of the control circuitry employed for attaining the foregoing objects of the present invention.

With reference to FIGURE 1 of the drawing, there is illustrated a refrigerator including an above-freezing storage compartment 1 maintained at desired storage temperature by means of an evaporator 2 disposed in the upper portion of the compartment 1 and adapted to form a below-freezing storage compartment for the storage of frozen foods. The evaporator 2 forms part of the refrigeration system including condensing means comprising a compressor 3 and a condenser 4; it being understood that the compressor, condenser, suitable capillary flow restricting means and the evaporator are connected in usual closed series flow relationship.

A refrigerator of this type is generally designed to maintain a fresh food storage compartment temperature of between about 35 and 40° F. while the evaporator operates continuously at an average or means temperature below freezing. It is also desirable to permit the user to select the desired storage temperature within this range.

In accordance with the present invention, this selection of the fresh food compartment temperature is obtained by a cyclic operation of the compressor 3 under control of a bimetal switch means 5 mounted in heat exchange relationship with the evaporator 2 and means for varying the temperature at which this switch means deenergizes the compressor following an "on" cycle.

The bimetal switch means 5, as is shown schematically in FIGURE 2 of the drawing comprises a bimetal switch arm 7, the free end of which carries a contact 8 movable by the bimetal arm 7 into and out of engagement with the fixed contact 9. When the contacts 8 and 9 are closed at an upper but below-freezing evaporator temperature of, for example, 25° F., a circuit is completed across the supply lines 10 for energizing the compressor. Operation of the compressor 3 to supply liquid refrigerant to the evaporator 2 causes the temperature of the evaporator to decrease. The compressor continues to operate until at a predetermined or selected lower evaporator temperature, the bimetal switch arm 7 opens the contacts 8 and 9 to deenergize the compressor.

In accordance with the present invention, means are provided for varying the evaporator temperature at which the compressor is deenergized by the opening of the contacts 8 and 9 to thereby permit the user of the referigerator to select a desired storage compartment temperature. To this end, the control includes a heating element 12 positioned in heating relationship with the bimetal switch arm 7 and an adjustable resistor or rheostat 14 which is connected in series with the heating element 12 and which is manually adjustable by means of a control knob 15.

The heating element 12 and variable resistor or rheostat 14 are connected across the supply lines 10 in parallel with the compressor 3 and in series with the bimetal switch means.

By means of this control circuitry, the bimetal switch means will close the contacts 8 ad 9 at a predetermined and fixed above-freezing temperature regardless of the setting of the variable resistor 14, and will open the contacts 8 and 9 to deenergize the compressor at a preselected below-freezing temperature selected by the user through the adjustment of the variable resistor 14. Since the heating element 12 is energized only when the compressor is operating, heat is fed to the bimetal to override the cooling effect of the evaporator only during the "on" cycle of operation. In other words, the evaporator temperature at which the compressor is de-energized depends upon the setting of the variable resistor 14. When the variable resistor 14 is set to provide a minimum heat output by the heating element 12, the compressor "on" cycle will be of the shortest duration and a compartment temperature close to the upper end of the temperature range will be maintained. When the variable resistor 14 is set to produce an increased heat flow from the heater to the bimetal, the ambient temperature adjacent the bimetal arm 17 is increased and accordingly the evaporator must attain a somewhat lower temperature in order to offset the heating effect of the thermal element and thereby open the contacts 8 and 9 to terminate an "on" cycle. This longer "on" cycle and the resultant lower evaporator temperature attained before the compressor is de-energized will in turn provide a lower mean average temperature in the storage compartment.

However, as the heater can be energized only when the compressor is energized, the length of the "off" cycle is not shortened so that the off cycle is long enough to permit unloading or pressure equalization of the system before the compressor is again energized.

While there has been shown and described a specific embodiment of the present invention it will be understood that is not limited thereto and is intended by the appended claims to cover all such changes and modifications as fall within the true spirit and scope of the invention.

What we claim as new and desire to secure by Letters Patent of the United States is:

1. In a refrigerator comprising a storage compartment, an evaporator forming in below-freezing storage volume disposed in said compartment for maintaining said compartment at above-freezing temperatures, refrigerant condensing means including a compressor for supplying condensed refrigerant to said evaporator and control means for controlling the operation of said compressor in response to the temperature of said evaporator, said control means comprising a compressor control circuit including a bimetal operated switch means positioned to sense the temperature of said evaporator to energize said compressor whenever the temperature sensed thereby reaches a first below-freezing temperature and to deenergize said compressor at a second lower below-freezing evaporator temperature, and means for adjusting the second temperature at which said compressor is deenergized to thereby control the storage temperature maintained in said compartment, said means comprising a heater circuit including in series connection a resistance heater in heating relation to said bimetal and means for changing the heat output of said heater, said heater circuit being connected in parallel with said compressor whereby said heater is energized only when said compressor is also energized by operation of said bimetal switch means.

2. The refrigerator of claim 1 in which said means for changing the heat output of said heater is a variable resistor.

References Cited

UNITED STATES PATENTS

| | | | |
|---|---|---|---|
| 2,060,774 | 11/1936 | Zurcher | 62—164 |
| 2,246,956 | 6/1941 | Shaw | 62—202 |
| 2,498,864 | 2/1950 | Root. | |

MEYER PERLIN, *Primary Examiner.*